United States Patent [19]
Carlin et al.

[11] Patent Number: 6,119,152
[45] Date of Patent: *Sep. 12, 2000

[54] SYSTEM FOR HOSTING AN ON-LINE SHOPPING SERVICE FOR REMOTELY-LOCATED SERVICE PROVIDERS

[75] Inventors: Richard K. Carlin, Houston; Joseph F. Frantz, II, Sugarland, both of Tex.

[73] Assignee: Telescan, Inc., Houston, Tex.

[*] Notice: This patent is subject to a terminal disclaimer.

[21] Appl. No.: 09/199,497

[22] Filed: Nov. 25, 1998

Related U.S. Application Data

[63] Continuation of application No. 08/634,326, Apr. 18, 1996, Pat. No. 5,845,073, which is a continuation of application No. 08/205,195, Mar. 3, 1994, Pat. No. 5,694,549.

[51] Int. Cl.$^7$ ..................................................... G06F 15/16

[52] U.S. Cl. .......................................... 709/217; 709/246

[58] Field of Search ........................ 395/200.47, 200.59, 395/200.55, 330, 200.34; 370/260; 709/217, 204, 225, 229

[56] References Cited

U.S. PATENT DOCUMENTS

| | | | |
|---|---|---|---|
| 5,384,910 | 1/1995 | Torres | 395/156 |
| 5,412,756 | 5/1995 | Bauman et al. | 395/50 |
| 5,584,025 | 12/1996 | Keithley et al. | 707/104 |
| 5,666,500 | 9/1997 | Roberson | 345/348 |
| 5,694,549 | 12/1997 | Carlin et al. | 395/200.2 |
| 5,774,874 | 6/1998 | Veeneman et al. | 705/27 |
| 5,845,073 | 12/1998 | Carlin et al. | 395/200.47 |

OTHER PUBLICATIONS

James Powell, "Adventures With The World Wide Web." Database, pp. 59–66, Feb. 1994.

Don Black, "The Source: dishing Up information for business and home," Link Up, V6, n2, p. 31(4), Mar./Apr. 1989.

List of Article Titles, DialogWeb Databases—DIALINDEX, © 1998 The Dialog Corporation plc, pp. 1–25.

Glasnost comes to The Source, Mar.–Apr., 1989, © 1989 Learned Information Inc., pp. 1–6.

*Softsel To Distribute The Source,* McLean, VA, Oct. 2, 1984.

Boom time for electronic commerce—rhetoric or reality? Paul Foley; David Sutton, Business Horizons, Sep.–Oct. 1998, v41, n5, p2(10).

List of 1989 Article Titles, DialogWeb Command Mode, © The Dialog Corporation plc, pp. 1–2.

Building a Strategy for Electronic Home Shopping, The McKinsey Quarterly, 1994 No. 4.

Various trademark registrations.

CompuServe Purchases The Source, Jul.–Aug., 1989, Joseph A. Webb, Information Today, v6, n7, p1 (2).

The Source Telecomputing Corp. Signs Agreement to Redistribute Monchik–Weber Market Data, Aug. 28, 1984, PR Newswire.

*Primary Examiner*—Mehmet B. Geckil
*Attorney, Agent, or Firm*—Conley, Rose & Tayon, P.C.

[57] ABSTRACT

An on-line communications service allows a plurality of service providers to provide services to respective groups of subscribers, with the on-line service from each provider being independent of the on-line service from other providers. The subscribers' access to features is maintained through service maps which are customized by the service provider interactively with the host computer. Upon log-on, the service map is downloaded to a subscriber's computer and defines the services which can be accessed, the appearance of the user interface and navigation through the services. Data for each provider's service is maintained separately from the data for other providers. Billing can be customized for each provider.

50 Claims, 7 Drawing Sheets

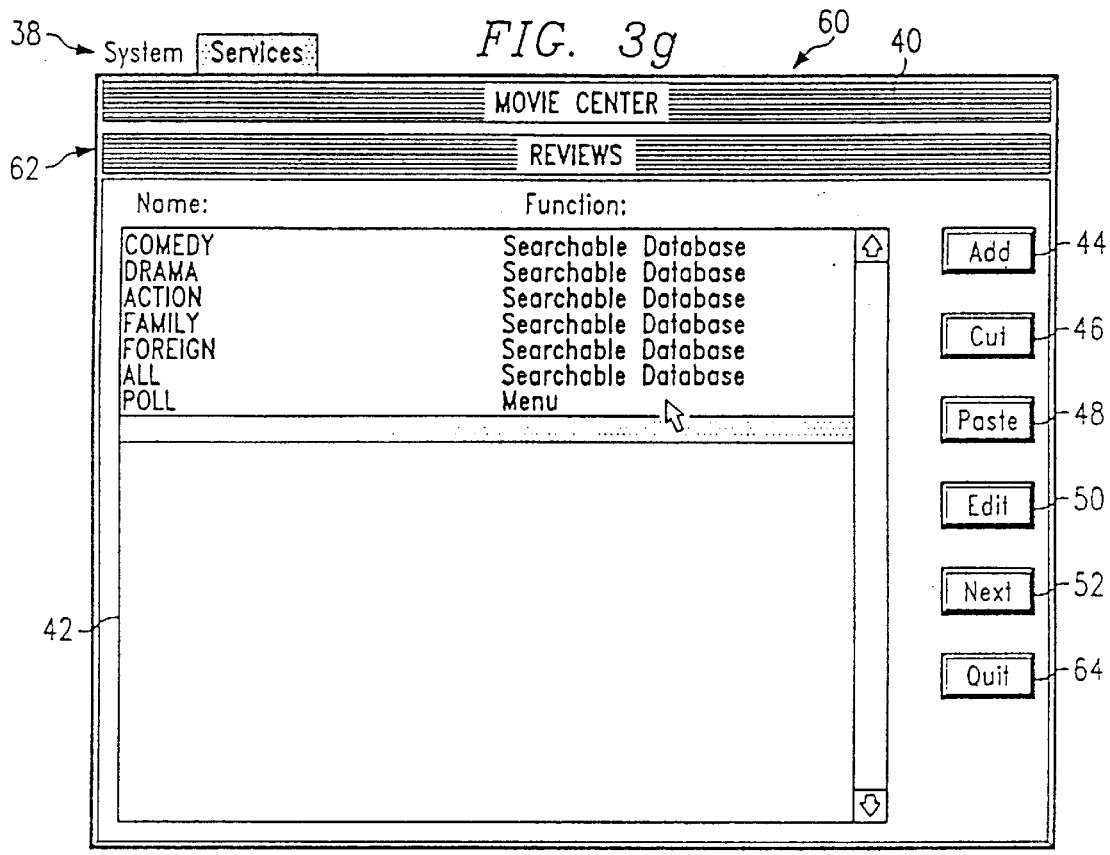
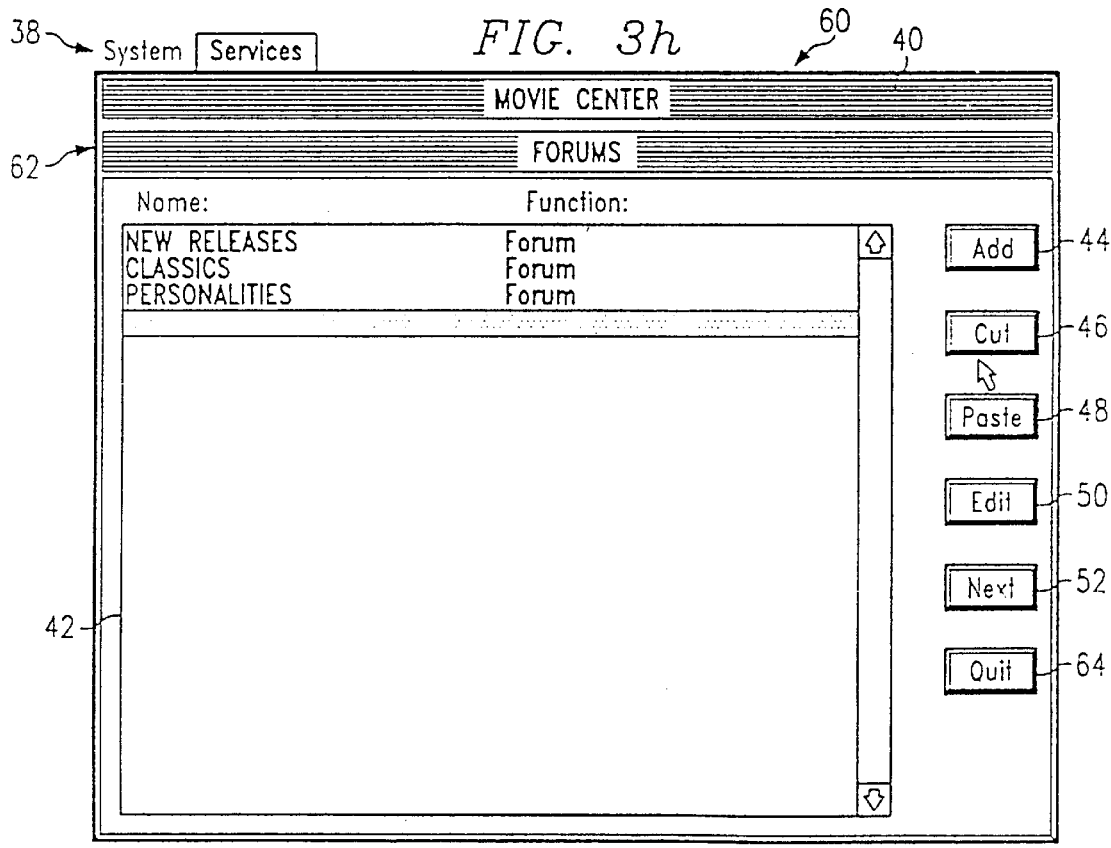

SYSTEM FOR HOSTING AN ON-LINE SHOPPING SERVICE FOR REMOTELY-LOCATED SERVICE PROVIDERS

This is a Continuation of application Ser. No. 08/634,326 filed on Apr. 18, 1996 and issued as U.S. Pat. No. 5,845,073, which in turn is Continuation of application Ser. No. 08/205,195, filed Mar. 3, 1994, now U.S. Pat. No. 5,694,549.

TECHNICAL FIELD OF THE INVENTION

This invention relates in general to on-line communication systems, and more particularly to an on-line communication system for providing separate private on-line services for multiple service providers through a centralized on-line system.

BACKGROUND OF THE INVENTION

Since the advent of the personal computer, a number of on-line services have come into being. To use an on-line service, the subscriber establishes a communications link to the provider of the on-line service over a communications line. A communications line is an electronic highway between two computers. The communications line can include, but is not limited to, modem phone line dial-up, X.25 networks, frame relay networks, ATM networks, TCP/IP networks, IPX networks, infrared networks, television cable and wireless cellular systems.

Once the communications link is established, the subscriber can communicate with the host system, which provides the on-line services. The host system can comprise, for example, a mainframe computer, a network of smaller computers, or even a single personal computer.

The range of features provided by existing on-line services is diverse. Large on-line services, such as COMPUSERVE, provide news and weather information, games, electronic mail, forums, chat lines and on-line shopping. Smaller services, such as Dow Jones News Retrieval, may only supply a small subset of those features. Bulletin board systems (BBSs) are designed to provide on-line services to a much smaller number of subscribers. In many cases, the BBSs are focused toward a particular subject matter or to a particular set of people, such as members of a club or employees of a company. For example, a software developer may have a BBS to provide product support for customers . A BBS of this nature will generally have electronic mail and file upload/download capabilities.

In general, a BBS has fewer capabilities and features available to its subscribers relative to larger on-line systems. Because a single BBS is generally designed to service a limited number of subscribers, it is not possible for a single BBS to provide certain features such as stock information, news retrieval or weather reports which may be offered by a larger on-line service. Another problem with BBSs and smaller on-line services is the time and effort needed to maintain the on-line service. While a number of software packages exist for implementing the BBS on a personal computer, the time required to customize the BBS to a certain configuration is significant. Further, a number of hardware or software problems may arise during operation of the BBS which require on-site human intervention to restart the system. Hence, for on-line services systems which must remain operational at all times, full-time human supervision is necessary.

Yet another problem with smaller on-line services is billing. While some services can bill through the telephone company using a 900 service or similar plan, such pricing is inflexible and may discourage membership in the service. Maintaining billing locally is once again time-consuming and costly to the owner of the on-line service.

Therefore, a need has arisen for a on-line service which may be configured to provide dedicated features to a small group of users while having a robust set of features and capabilities and reduced maintenance and billing capabilities for service providers.

SUMMARY OF THE INVENTION

In the present invention, a multi-provider on-line service offers a number of on-line services. The multi-provider on-line system may be uniquely configured by a plurality of service providers, such that each service provider can offer its own subset of features to its subscribers and customize the appearance of the user interface. Each subscriber is associated with a service provider, typically through a subscriber ID. When a subscriber logs on to the on-line system, he or she may access the subset of features determined by the service provider.

The present invention provides significant advantages over the prior art. A company or individual who wishes to provide a private on-line system can customize the multi-provider on-line system to offer the desired features. Subscribers to a particular service have access only to those features chosen by their service provider, and subscribers to other services on the multi-provider on-line service do not have access to the particular service's private data, unless such data has been authorized for public use. Hence, each provider can generate an on-line service which appears to the subscriber to be an independent on-line service. However, because the multi-provider host can economically offer advanced features to the service providers, each service provider can offer features which might otherwise be impractical for a small service provider. Further, the service provider does not need to maintain the equipment for providing the on-line service or concern itself with billing matters.

In one aspect of the present invention, data can be "published" by a service provider, whereby certain databases, which are private to the service provider, can be made accessible to other providers on the multi-provider on-line system for inclusion in the other providers' subset of features. The publishing provider can set a fee for accessing the data.

In a second aspect of the invention, a provider's subset of features may include a menu entry which allows a subscriber to "menu hop" to another service. For example, if a service provider has two separate on-line services on the multi-provider on-line system, it may allow subscribers of one service to switch to the other service, without the need to log off and establish a connection with the other service. When a menu hop is requested, the multi-provider on-line service changes the subset of features to which the subscriber has access from the subset provided by the first service to the subset provided by the second service.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3a–j illustrate the generation of a private on-line service by a service provider;

DETAILED DESCRIPTION OF THE PREFERRED EMBODIMENTS

Figure 1:
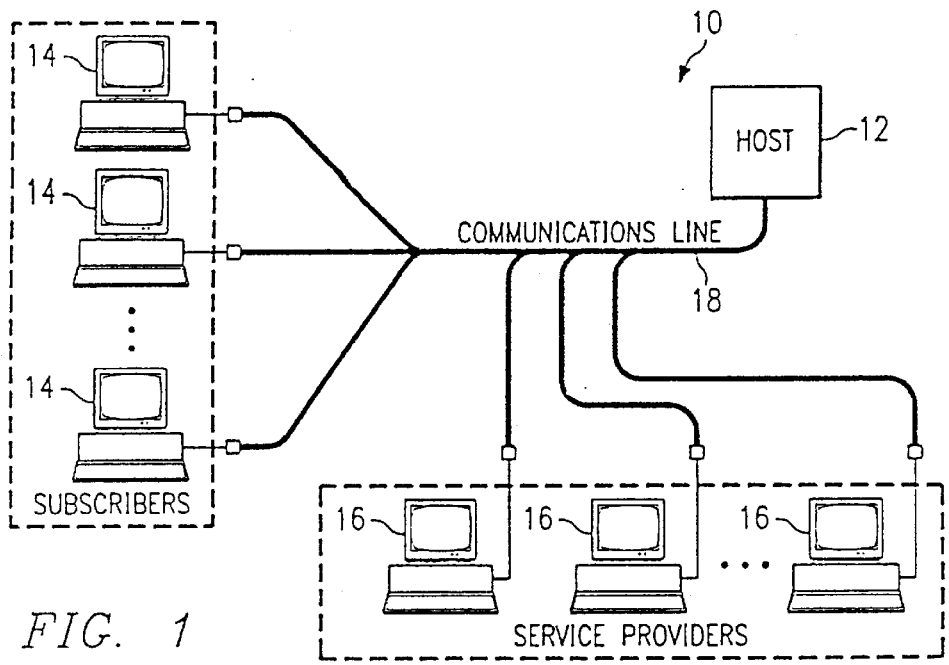
FIG. 1 illustrates a schematic representation of a communication system.

FIG. 1 illustrates a schematic representation of an on-line service using the multi-provider on-line system of the present invention. The multi-provider on-line system, generally referred to by reference numeral 10, is controlled by host computer 12, which is connected to a plurality of terminals. For purposes of illustration, the terminals are denoted in FIG. 1 as subscriber terminals 14 and service provider terminals 16. The terminals 14 and 16 communicate with the host 12 through communications line 18.

In operation, the host computer 12 is operable to provide a plurality of features to the subscriber terminals 14 via the communications line 18. The features which may be provided by the host 12 may vary; typical features which would be provided by the host 12 would include electronic mail, forums, newsletters, roundtables, on-line purchasing, and searchable databases. These features are well known in the art. A more detailed list of features is provided in Table I, hereinbelow. This list is not meant to be comprehensive of the features which may be offered by a particular service in accordance with the invention, but is provided as an example of what may be offered by the host computer 12.

TABLE I

Example On-Line Features

General

Not Available
    Easylink Gateway
    Menu
    Searchable Database
    All Searchable Databases
    Text
    Text Collection
    Multi-media Document
    Multi-media Document Collection Billing Account Info
    Bill Summary
    Monthly Bill
    Monthly Usage Communications Calendar
    Conferencing
    Classified
    Directory
    Electronic Mail
    Employment
    Forum
    Newsletter
    Poll
    Products
    Prof Interest Area
    Roundtables
    Software
    video Conferencing TABLE I-continued Example On-Line Features News Services Business
    Commodity
    Feature
    World & Natl
    Market
    Monetary
    Sports
    Stocks - Comtex
    Stocks - Reuters Stock Information Facts
    Insider Trading
    Listed Options
    Macro*World Reports
    Marketguide Reports
    Morning Star Reports
    Mutual Fund Directory
    Quarterly Earnings
    S&P Marketscope Reports
    Technical Criteria
    Valuation Criteria
    Zacks Earnings Estimates Market Analysis Current Quotes
    Graphs
    Historical Quotes
    Prosearch - Mutual Funds
    Prosearch - Options
    Prosearch - Stocks
    Symbol Lookup
    Top Picks S&P MarketScope Action Menu In contrast to present-day systems, the multi-provider on-line system allows a plurality of service providers, who would normally require their own on-line equipment and staff to offer a private on-line service, to define a set of features to offer to subscribers. Hence, each service provider can generate a private on-line service to be offered to subscribers using the features offered by the host 12 and, where appropriate, upload data for access solely to its own subscribers. The service provider may then offer the private on-line service to a group of subscribers of its choosing. This group of subscribers can access the features chosen by the service provider and will not have access to other features offered by the host computer 12 which are not chosen by the service provider or to information provided by other service providers.

For example, a first service provider may be offering support for a software package. The software provider could set up a private on-line service which provided for electronic mail, forums in which the subscribers could communicate with the service provider's technical staff and with each other to discuss the application, newsletters to update the subscriber's items of interest relating to the application, a file library from which subscribers can download files relating to the application and an on-line shopping area in which subscribers could order products through the service provider. A second service provider may offer a service to antique car enthusiasts. This service may also provide electronic mail, forums, newsletters, on-line shopping, as described in connection with the first service provider, and further provide a searchable database of articles on antique cars whereby the subscribers to the second service can search the articles for research purposes. While both the software support service and the antique car club service are provided from the host computer 12, the two services do not interact. Subscribers to the first service cannot access the electronic mail, forum messages, newsletters, on-line shopping areas, or searchable database of the second service. Likewise, subscribers to the second service cannot access the electronic mail, forum messages, newsletters, file library or on-line shopping areas of the first service. In other words, while both services offer some of the same features (electronic mail, forums, newsletters, and on-line shopping), the data related to these services is kept separate so that subscribers of one service cannot access data from another service. Consequently, each subscriber sees the on-line service to which he or she subscribes as an independent service provided by the service provider.

Although each subscriber sees the associated on-line service as independent, the central administration of the multiple private on-line services offers economy of scale and ease of administration. For example, a small on-line service may not be able to afford a sophisticated search engine for searching large textual databases. However, the host 12, which may be servicing a large number of small, private on-line services can offer a sophisticated on-line search engine, which may be used by each service provider in conjunction with their textual databases. Hence, each service provider can offer enhanced features on a small scale while maintaining control over access of its data.

Another advantage of the system shown in FIG. 1 is that the host computer 12 is maintained by the multi-provider on-line service. Hence, the service provider does not need to provide maintenance personnel to oversee the operation of the on-line service. A third advantage of the multi-provider on-line service is that all billing to the subscribers may be centrally administered through the multi-provider on-line system 10, rather than by the individual service providers. Hence, the service providers receive the difference between the revenues from the subscribers less the cost of supplying the services through the host 12. Consequently, the service providers may offer a sophisticated on-line service with very few responsibilities other than uploading specific data to be used in connection with their private on-line service.

The host computer 12, shown in FIG. 1, may take a variety of forms. In the preferred embodiment, the host 12 is a network of mini- or micro-computers which are networked together. This host structure allows the capacity of the host to be increased as demand increases. In other embodiments, a larger computer, such as a mainframe computer, or a plurality of mid-size or mainframe computers, may be used. The terminals 14 and 16 can comprise, for example, personal computers. It should be noted, however, that the terminals 14 and 16 may comprise other processing systems, such as interactive television devices or any other device capable of connecting to a central processing system over a communications line.

Figure 2:
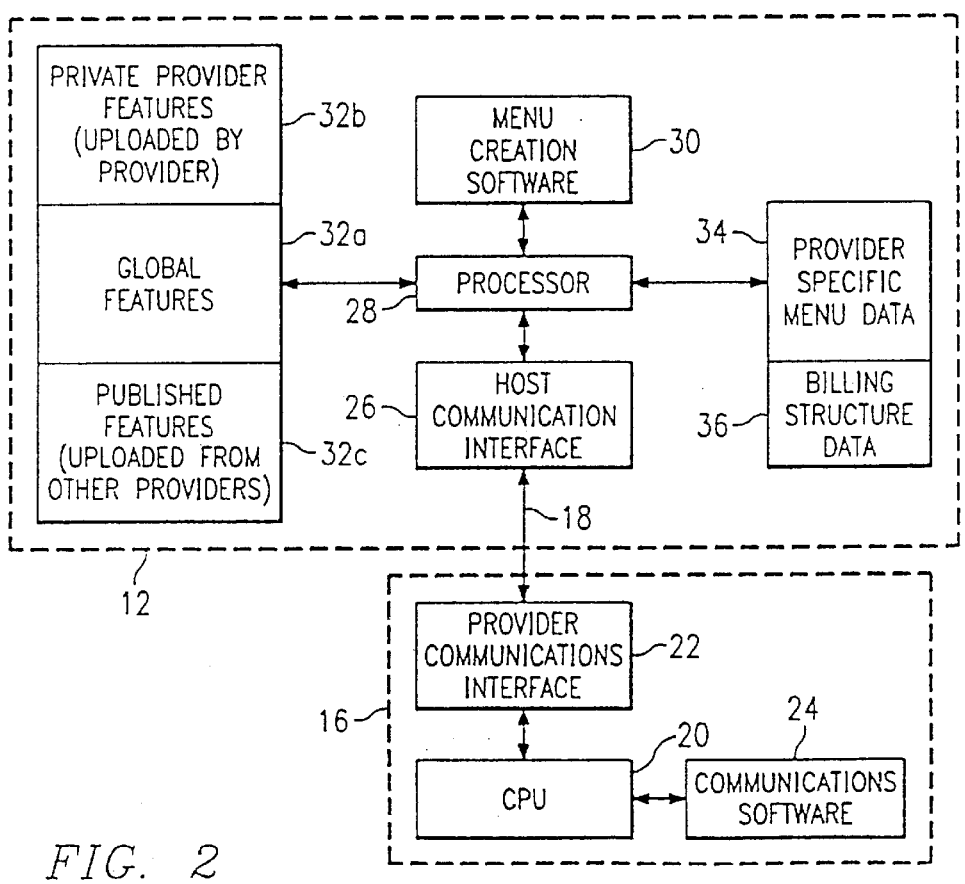
FIG. 2 illustrates a functional block diagram of the communication system with respect to generation of a private on-line service by a service provider.

FIG. 2 illustrates a functional block diagram illustrating the operation of the host 12 and a service provider terminal 16 in connection with definition of a private on-line service. The service provider terminal 16 includes a central processing unit (CPU) 20 coupled to a communications interface 22 and communication software 24. Communications interface 22 is typically a modem or other device for coupling the provider terminal 16 to the communications line 18. The communication software controls operation of the CPU and communications interface such that data can be sent to, and received from, the host 12 over communications 18. The host 12 sends and receives data to and from the service provider terminal 16 through host communication 26, which is coupled to processor 28. Under control of menu creation software 30, the processor interacts with the service provider to define a set of features to which the service provider's subscribers will have access. There are three main categories of features from which the service provider may choose. The first category includes the global features 32a, which are features supplied by the owner of the host and are accessible to all service providers. The second category includes private provider features 32b, which are features supplied by the provider creating the menu. These features must be uploaded (or otherwise supplied) by the provider, and are not accessible by any other provider. An example of this type of feature is a searchable database, such as the antique car database described above, uploaded by a service provider. The third class of features includes published features 32c. These are features uploaded from another provider who has designated these features as "published." A published feature may be accessed by any provider to include in its definition of features. The "publisher" of the features dictates the fee for access of the published service by subscribers of other providers.

An exemplary method of defining the features to be provided is shown in FIGS. 3a–j. The set of features for a particular service provider is referred to as a "map." The map associates the features with the subscriber interface. Once the map is defined, data for the map is stored in the provider specific menu data 34. Further, the provider can specify the desired billing structure for its subscribers (i.e., flat-rate, hourly rate, and so on). The billing specified by the provider determines how much its subscribers will be charged for accessing the private on-line service. The billing structure data is stored in block 36. The owner of the multi-provider on-line service subtracts its fees from the revenues received from the subscribers and pays the difference to the provider.

Figure 3A:
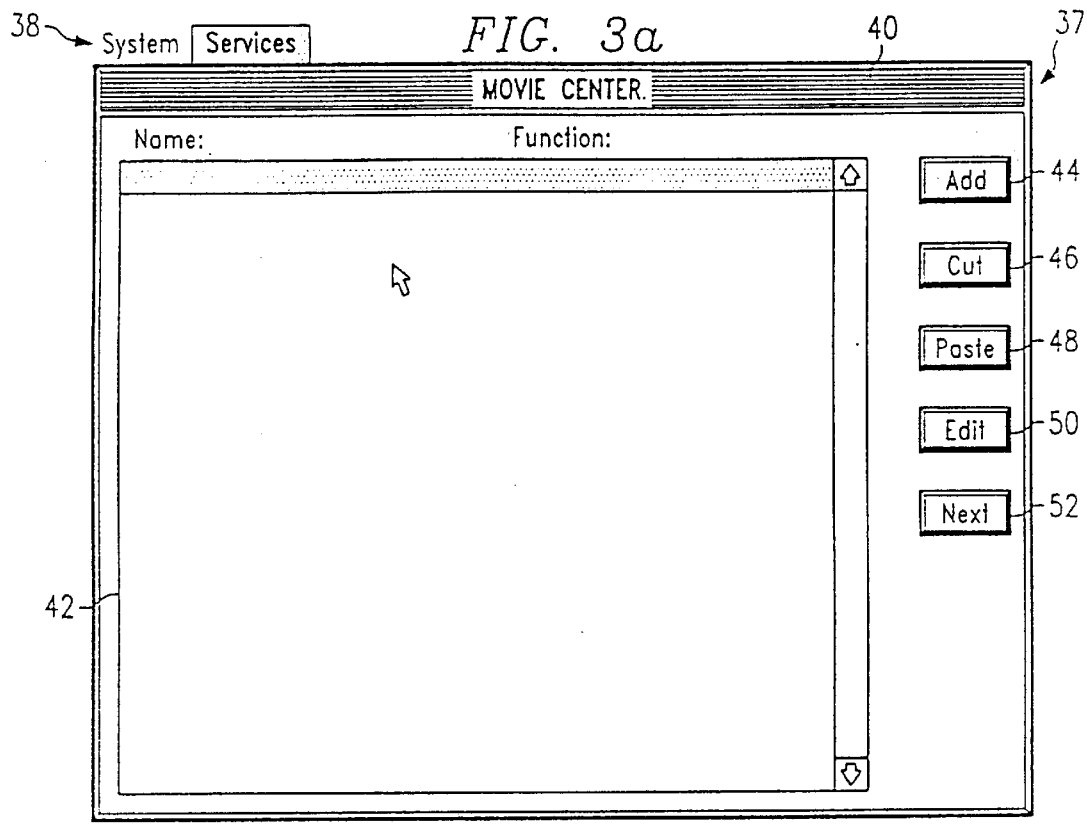
Figure 3B:
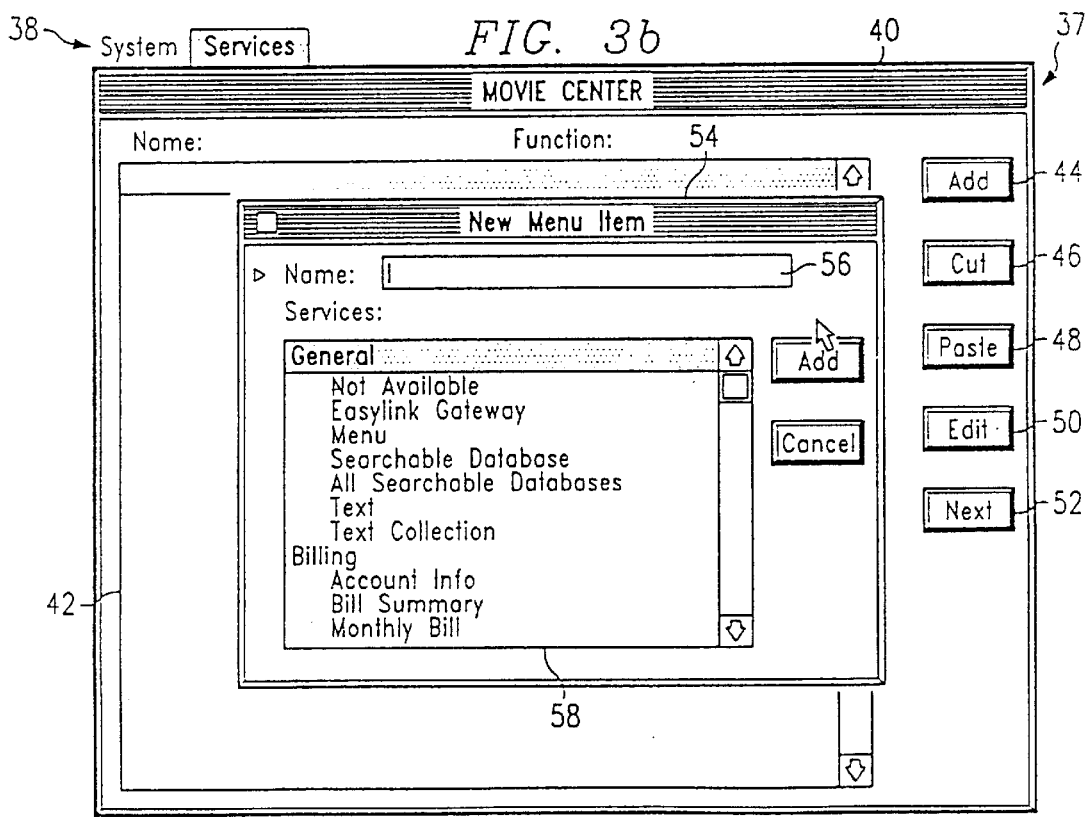

FIGS. 3a–i illustrate an exemplary method of the creation of map information along with a menu defining the features to be provided to the subscribers. FIG. 3a illustrates an initial screen 37 for defining the menu. The screen includes a menu bar 38, a title bar 40 with the name of the service, a window 42, an ADD button 44, a CUT button 46, a PASTE button 48, an EDIT button 50 and a NEXT button 52. To create a new service, "create map" (not shown) is chosen from the "services" menu on the menu bar 38 to define the features to be used in the service along with a user interface.

Figure 3C:
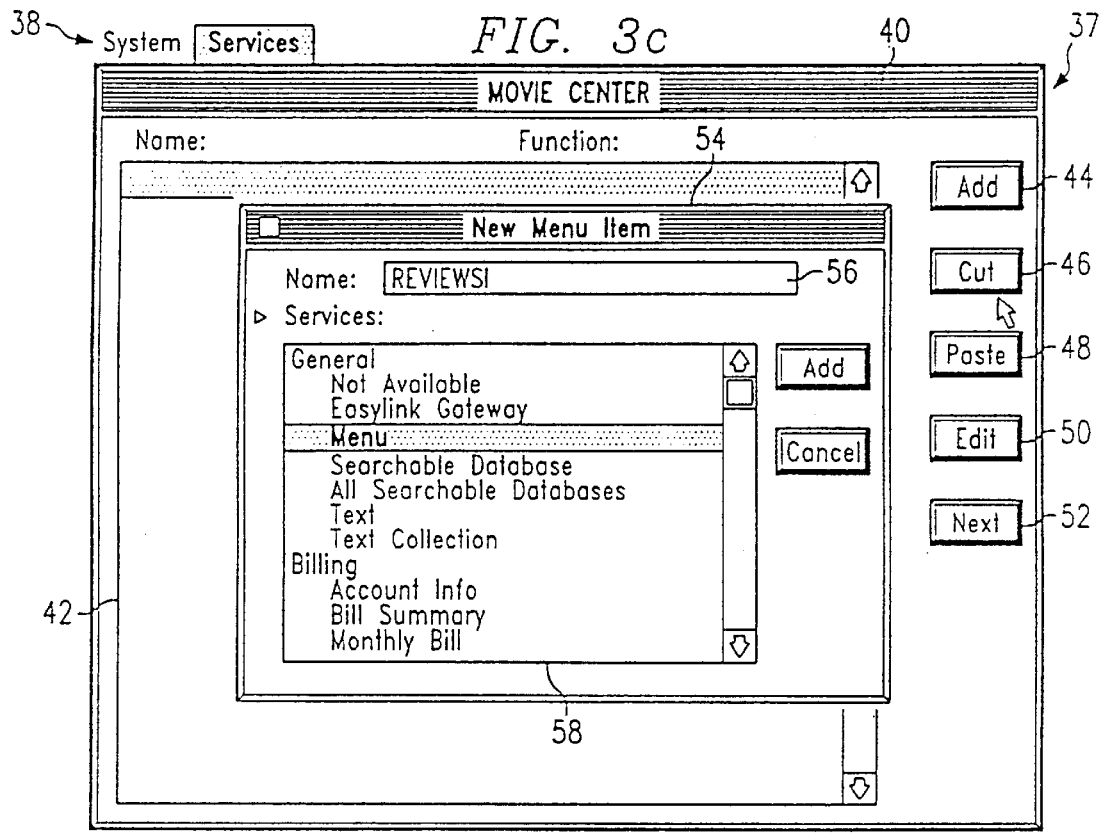
Figure 3D:
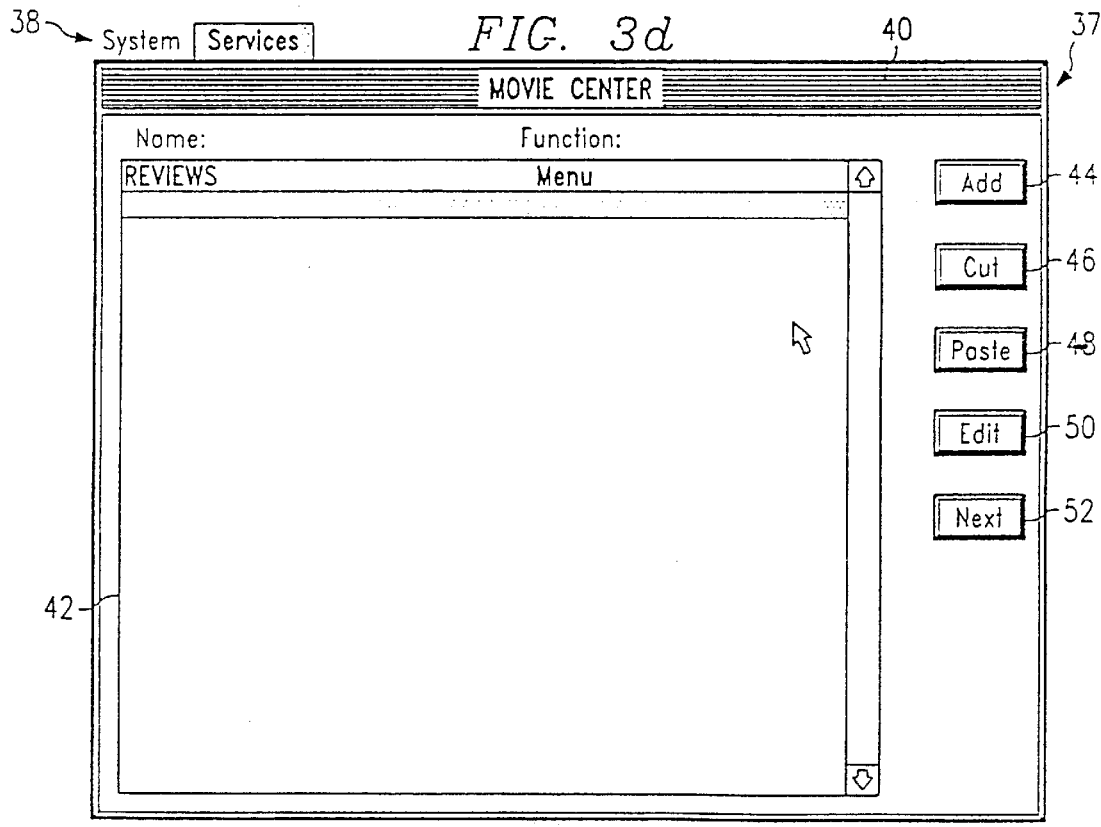

By pressing the ADD button 44, a dialog box 54 is displayed (shown in FIG. 3b), with a field 56 for the provider to enter the name of the menu item and a list of available features in window 58. By entering a name and selecting a feature, the menu item is generated. In FIG. 3c, a "REVIEWS" menu item is created. "REVIEWS" will be a top-level menu item; i.e., REVIEWS will be displayed on the menu bar of the subscriber's user interface (see FIG. 3j). By pressing ADD, the dialog box 54 is removed and the data is entered into window 42, showing the name and function of the menu item (see FIG. 3d).

Figure 3E:
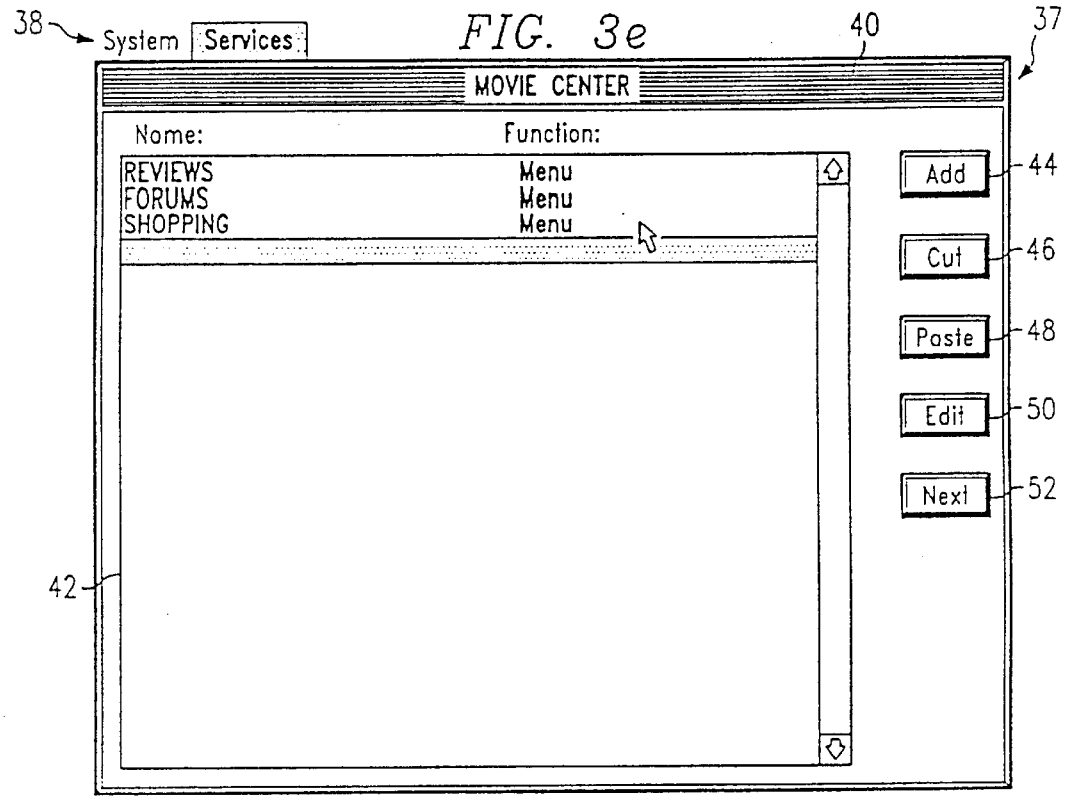

In FIG. 3e, the screen 37 is shown after three top-level menu items have been entered using the method shown in connection with FIGS. 32a–d.

Figure 3F:
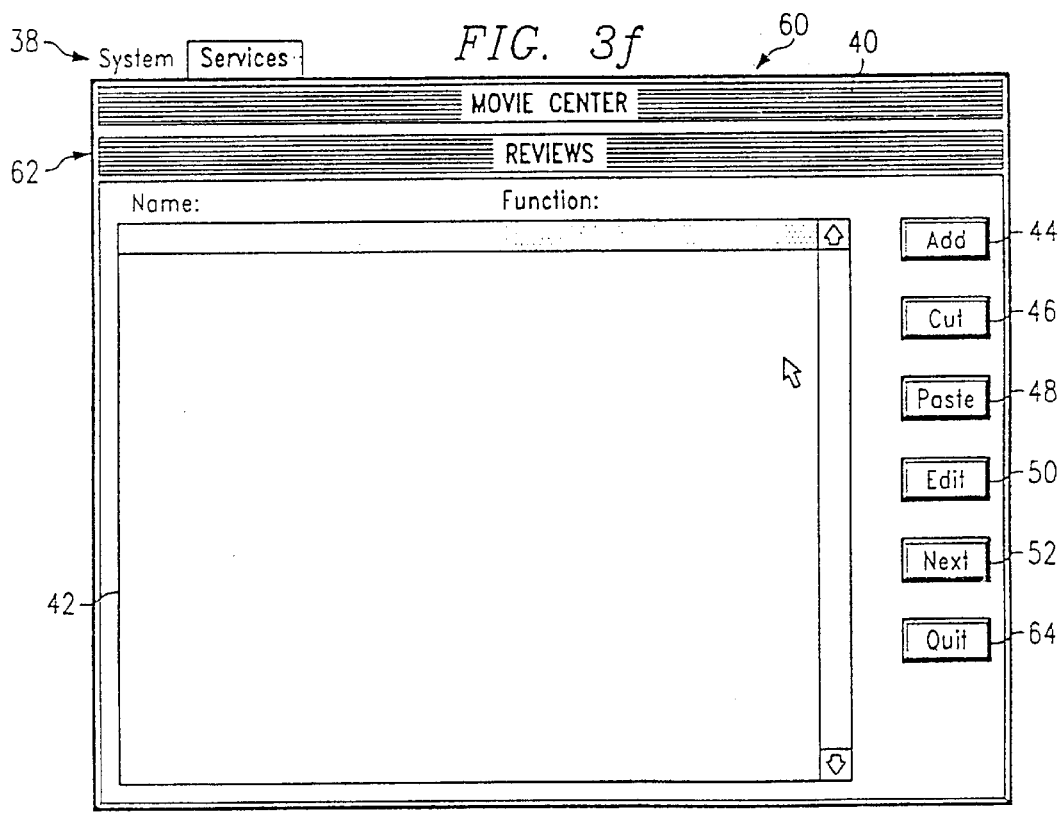
Figures 3I, 3J:
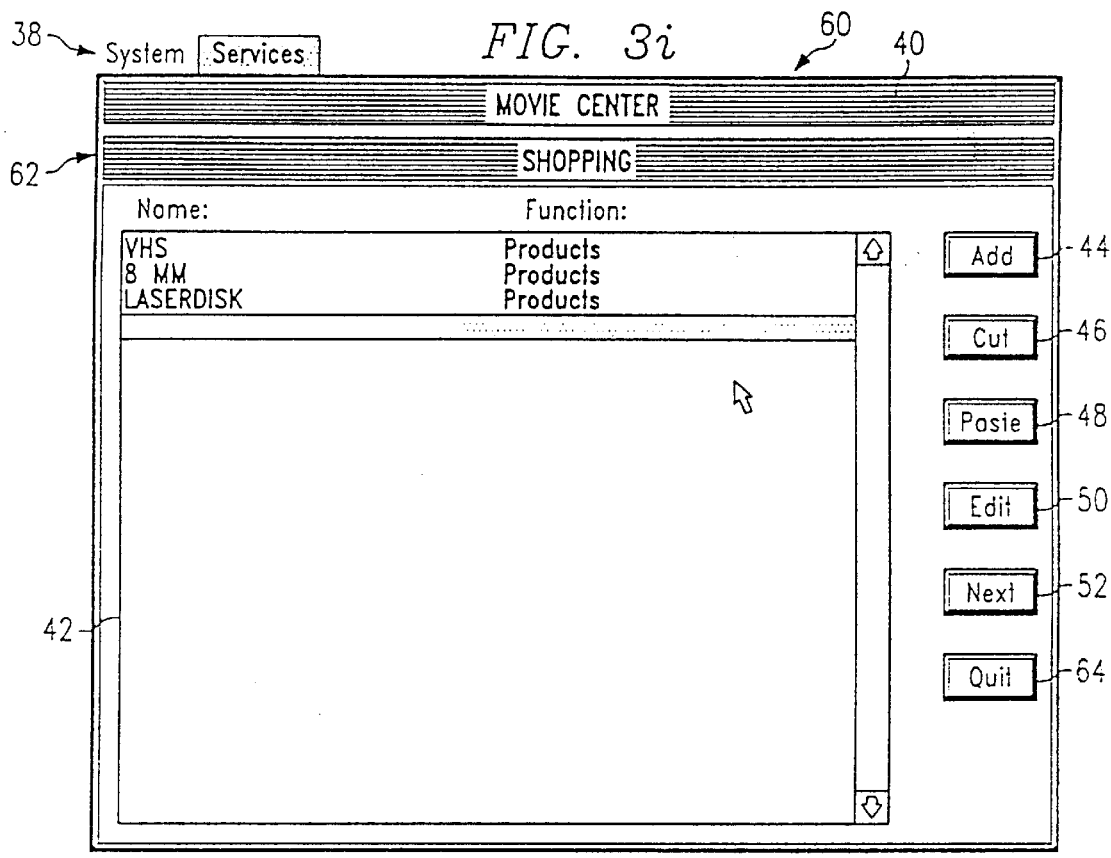

By highlighting a menu item (REVIEWS, FORUMS or SHOPPING) in window 42 and pressing the NEXT button 52, a lower-level menu structure may be generated. As shown in FIG. 3f, a second input screen 60, having a second level title bar 62, is displayed which is otherwise the same as input screen 37 of FIG. 3a. Using the method described in connection with FIGS. 3a–d, the subheadings for the REVIEWS menu item are entered. As shown in FIG. 3g, the REVIEWS menu item has seven subitems, including six searchable databases (COMEDY, DRAMA, ACTION, FAMILY, FOREIGN and ALL) and a second level menu item entitled POLL. Additional menu topics for the POLL menu item could be generated by highlighting POLL and pressing the NEXT button 52. When the selections for the REVIEWS menu item have been entered, the QUIT button 64 is pressed, which returns the provider to the screen shown in FIG. 3e. FIGS. 3h and 3i illustrate the second level menu screens for the "Forums" and "Shopping" first level menu items, respectively.

FIG. 3j illustrates a resultant menu which would be displayed at the subscriber's terminal for the service defined in connection with FIGS. 3a–i. As shown, the first level menu, "REVIEWS," has been selected and second level menu item, POLL, has been selected from the menu list under "REVIEWS", showing third level menu features, "Results" and "Vote." Navigating pull-down menus of this type is well known in the art.

While a particular user interface is shown in FIG. 3i, it should be noted that other interface styles and features could be provided. For example, in addition to, or in place of, the menu bar generated in FIGS. 3a–i, additional interface objects, such as buttons, icons, drop-down boxes can be used to implement the interface.

When the provider has finished defining its private on-line service, the host generates a service map which defines the set of features available in the service and the menu to be used by the provider's subscribers. The service map is stored in the host 12 in the provider specific map data memory 34. The service map may comprise, for example, a linked list of menu codes which define the menu structure. The menu codes are associated with features to be provided by the host.

Figure 4:
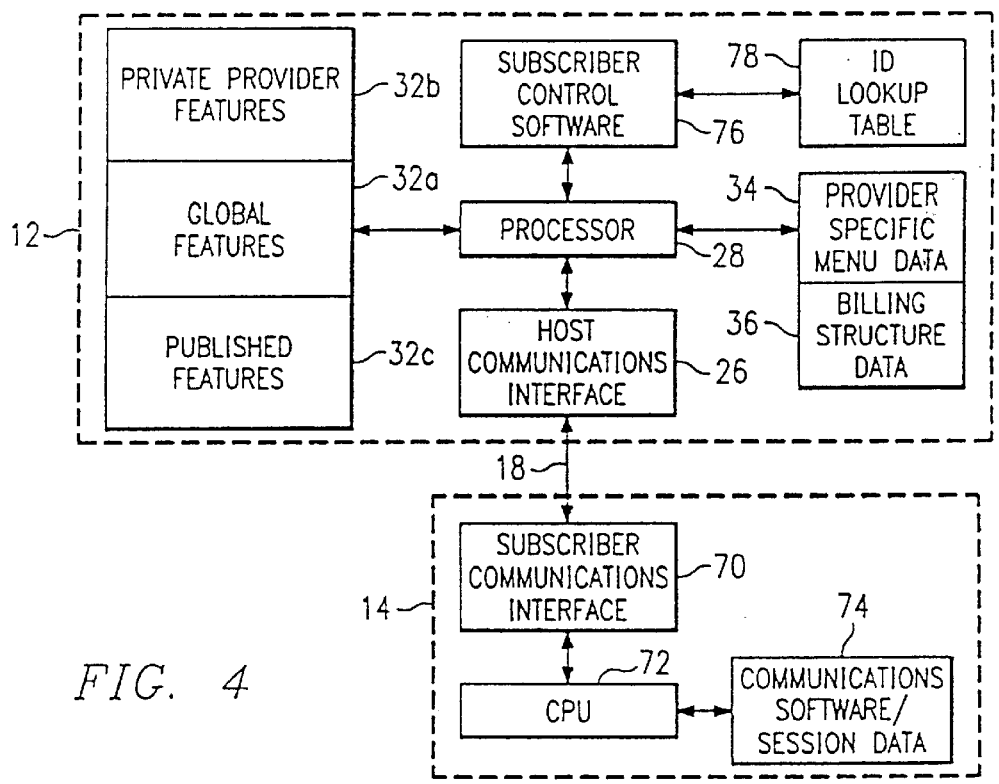
FIG. 4 illustrates a functional block diagram illustrating operation of the communication system with respect to a subscriber.

FIG. 4 illustrates a functional block diagram relating to a subscriber session with the host 12. The subscriber terminal includes a communications interface 70 to couple the terminal to communications line 18. The communications interface is coupled to CPU 72 and communications software/session data 74. The communications software/session data 74 is supplied to the subscriber from the provider and includes the software for communicating with the host 12 along with personal data for the subscriber. Typically, each subscriber is assigned a subscriber ID and password. The subscriber ID is used by the host 12 to determine which providers service the subscriber is associated with.

The host computer 12 processes data from the subscriber terminal under control of subscriber control software 76 in conjunction with ID look-up table 78, provider specific map data 34 and billing structure data 36. Operation of the host 12, in connection with a subscribers session, is best understood in connection with the flow chart of FIG. 5. In block 80, the subscriber establishes a communications link with the host 12 through communications interfaces 70 and 26. Once the communications link is established in block 80, the subscriber ID is uploaded from the subscriber terminal to the host 12 in block 84. In block 86, the subscriber ID is used by the host 12 to determine which provider service is associated with the particular subscriber. Typically, this is determined through use of a look-up table 78. When the subscriber's associated service is determined, the service map for that service is accessed from the provider's specific map data 34 and that menu information is downloaded to the session data of the subscriber terminal 14 (block 88). The menu data, which is downloaded to the subscriber terminal, defines the actions from which the subscriber can select. Each menu item is coded such that a selection by the subscriber (through interaction with the menu or other user interface controls), in decision block 90, causes the menu code to be sent to the host 12. The subscriber control software 76, in conjunction with the map/menu data information in provider specific map data 34, interprets the code and processes the requested action in block 94.

In the preferred embodiment, the host interactively controls the transfer of menu information to the subscriber terminals 14, such that only the requested menu information is stored in the host at any one time. For example, in the interface illustrated in FIG. 3j, the subscriber would initially be provided with the information for the top level menu, i.e., SYSTEM, REVIEWS, FORUMS, SHOPPING. When a selection was made, that information would be sent to the host 12, which would decode the selection in accordance with the information stored in the provider specific map data 34. If the user selected REVIEWS, for example, a code specifying "menu 2, level 0" (or similar code) would be uploaded to the host 12. This information, along with information identifying the service, would result in transfer of the submenu items for the REVIEWS menu from the host 12 to the subscriber terminal 14. A selection of ACTION from the submenu items would result in transfer of the code "menu 2, level 3" to the host. The host, using map information for the provider would identify the selected action as the searchable database for action films. This embodiment provides a significant advantage; the map may be changed on the fly by the service provider, with the changes being available to the subscriber immediately.

An alternative embodiment would transfer all map or menu information to the subscriber terminal upon initiation of a session. This would provide somewhat faster operation, but would not be 2S flexible.

As discussed above, a service provider may allow for "menu hopping", i.e., allowing the subscriber to jump from one service to another. If the menu code corresponds to a menu hop, the subscriber control software 76 causes the service map for the new service to be downloaded to the subscriber terminal 14. Once the new service menu is downloaded, the subscriber is confined to the set of features in the new service.

Figure 5:
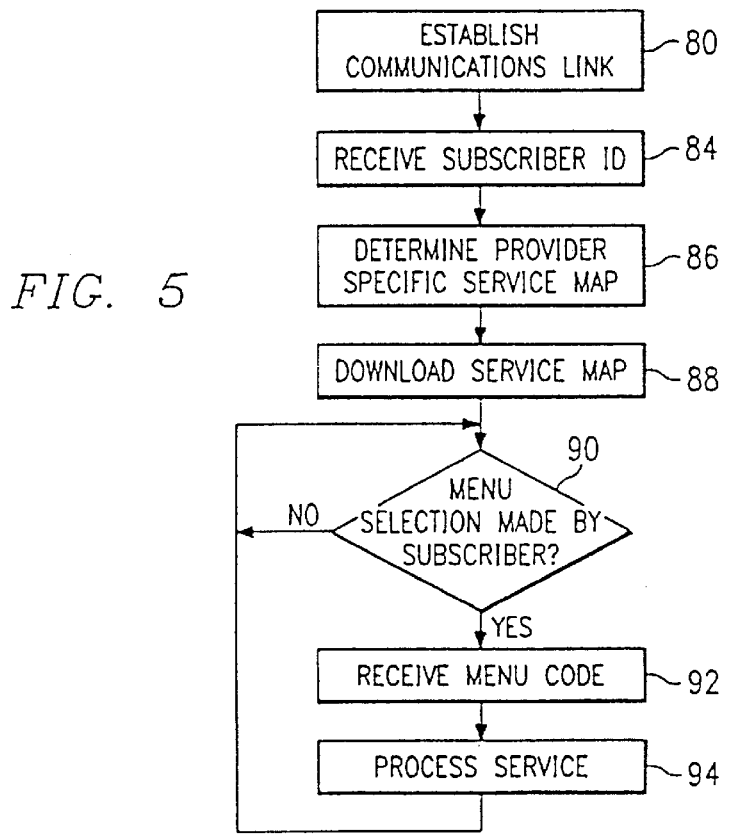
FIG. 5 illustrates a flow chart describing operation of the on-line service during a communication session with a subscriber.

FIG. 5 illustrates the preferred method of restricting access to host features through a service map and menu data which is downloaded to the subscriber's terminal and is used by the communications software on the subscriber terminal to restrict the subscriber to specific features defined by the service provider. Alternatively, the interface could be wholly controlled by the host, rather than by the subscriber terminal, responsive to the service map.

As can be seen from FIGS. 4–5, from the subscriber's standpoint, it appears that he is connected to a on-line service which is administered by the service provider. Since all electronic mail, forums, roundtables, newsletters and similar features are restricted to the subscribers of the particular private on-line service, the on-line service can be used in situations where privacy is important.

The multi-provider on-line service described herein has significant advantages over the prior art. Cost to service providers, and hence, subscribers, are reduced because of the central administration of the equipment and services for a multitude of distinct service providers. Because the number of subscribers of the overall multi-provider on-line service can be much greater than the number of subscribers to any one private on-line service, enhanced features can be provided for access by all service providers which may be prohibitive for any one service provider to supply. Further, the complexity and cost of billing are centralized such that the service providers need only be concerned with the billing structure, and not the day-to-day accounts management. In some cases, a service provider may enhance revenue by publishing services which may be used by other service providers.

It should be noted that the preferred embodiment described herein differs greatly from prior art services such as PRODIGY or COMPUSERVE which allow gateways to other services. In a gateway, the subscriber is transferred to another service on another host, as opposed to the present invention, where the host maintains multiple services.

Although the Detailed Description of the invention has been directed to certain exemplary embodiments, various modifications of these embodiments, as well as alternative embodiments, will be suggested to those skilled in the art. For example, the creation of service maps by the service providers could be performed off-line (after downloading the available features from the host) and then uploaded by the user. Further, the look and complexity of the menus could be varied as desired.

The invention encompasses any modifications or alternative embodiments that fall within the scope of the Claims.

What is claimed is:

1. A method of hosting an on-line shopping system in which products from a plurality of remote service providers may be purchased by a plurality of remote subscribers, comprising:
    storing service maps for service providers in a host computer, with each service provider being capable of customizing its associated service map, and said service maps including products that may be selected for purchase by the plurality of remote subscribers, wherein the types of products are specified by the remote service providers as part of the customization of the associated service map;
    receiving a request from at least one of said remote subscribers for the service map of at least one of said remote service providers;
    transmitting said requested service map from said host computer to said subscriber over a communications link;
    in response to the selection of one of said products by said subscriber, receiving at said host computer a code from said subscriber identifying the selected product; and
    transmitting data associated with the selected product from said host computer to said subscriber.

2. The method of claim 1 including permitting said service providers to remotely edit said service maps via said communications link.

3. The method of claim 1, wherein the service maps also comprise a menu, and the data associated with the selected product includes product information.

4. The method of claim 1, further including receiving billing information from service providers and storing said billing information on said host computer.

5. A method as in claim 1, wherein, in response to receiving the request from said remote subscriber, an on-line search is conducted of the stored service maps.

6. The method of claim 1 further including creating said service maps off-line.

7. The method of claim 6 further including uploading said service maps to said host computer.

8. The method of claim 1 further including generating representations of said service maps off-line.

9. The method of claim 8 further including receiving said representations at said host computer and creating service maps from said representations.

10. The method of claim 1 wherein said act of receiving a request from at least one of said remote subscribers includes receiving a request from an interactive television device and said transmitting act includes transmitting said requested service map to an interactive television device.

11. A method of selling products from multiple service providers through an on-line system, comprising:
    generating a menu associated with each service provider that defines a plurality of options that may be selected by a remote on-line purchaser, with each menu being customized by the associated service provider to define the options and products that are available from that service provider;
    uploading the menu to a remote host computer via a communications link, said host computer storing said menu as a service map and being capable of interactively completing transactions with remote on-line purchasers based on said service map; and
    receiving, from said host computer, data that provides information on transactions between remote on-line purchasers and the host computer.

12. The method of claim 11 including editing said menu via said communications link.

13. The method of claim 12 wherein said service map includes a plurality of map codes associated with said options, and wherein each map code identifies a distinct option.

14. The method of claim 13 wherein said uploading act includes uploading said map codes to said host computer via said communications link.

15. The method of claim 12 wherein the service map belongs to a first service provider, and wherein the service map includes an option for each remote purchaser to receive a service map belonging to a second service provider.

16. The method of claim 12 wherein said options include an option for a remote purchaser to purchase a product from a service provider.

17. The method of claim 12 wherein said transactions comprise purchasing transactions.

18. The method of claim 12 wherein said data comprises a request from a subscriber to purchase a product from said service provider.

19. The method of claim 11, wherein said remote on-line purchasers select a service map of a service provider by transmitting an identification code to said remote host computer.

20. The method of claim 19 wherein said transactions include receiving a request from a remote purchaser to purchase a product from said service provider through said host computer.

21. The method of claim 11 further including uploading billing information to said host computer.

22. A method as in claim 11, wherein said remote on-line purchasers request a service map by transmitting a search request to said remote host computer.

23. The method of claim 11 wherein said uploading act includes uploading the menu form an interactive television device.

24. A method of providing an on-line service, comprising:
    storing customized service maps from a plurality of remote service providers at a host computer, said service maps listing products that are available for purchase on-line from said service providers, wherein said products are determined by the service provider as part of the customization of its associated service map;

receiving from remote users, via a communications link, a signal selecting one of the plurality of remote service providers;

transmitting, front said host computer to the remote user, the service map associated with the selected service provider, said service map including a plurality of options that may be remotely selected by the remote user; and receiving from said remote user a map code that indicates the option selected by the user from said service map.

25. The method of claim 24 wherein said service map includes said map code.

26. The method of claim 24 wherein said options include selecting a service map from another service provider.

27. The method of claim 24 wherein said service map also comprises a menu of said options.

28. The method of claim 24, wherein said options include the products available for purchase from the selected service provider.

29. A method as in claim 24, wherein the signal selecting one of said plurality of service providers also comprises a search request made to said host computer.

30. The method of claim 24 further including:

receiving from said remote user a request for the service map of another remote service provider; and transmitting from said host computer the requested service map.

31. A method of remotely providing an on-line service on a host computer between a plurality of remote service-providers and a plurality of remote users, comprising:

(a) storing a service map for each individual remote service provider, the service map capable of being remotely edited or updated by said individual remote service provider, wherein the service map includes a set of products customized by the individual remote service provider that can be ordered from the associated individual remote service provider through the host computer;

(b) communicating with a plurality of remote user terminals;

(c) associating the remote user terminals with the service map of a particular service provider as selected by said remote users; and (d) interactively providing said remote user terminals with the set of products included in the service map of a particular individual remote service provider.

32. The method of claim 31 wherein (c) comprises receiving an identification code from the remote user terminals and determining the associated service map responsive to the identification code.

33. The method of claim 31 further comprising transmitting a menu for the associated service map from the host computer to the remote user terminal.

34. The method of claim 33 wherein the remote user terminal comprises a user interface responsive to said menu to display accessible features on said remote user terminal responsive to the associated service map.

35. The method of claim 34 wherein (d) further comprising receiving at the host computer data from the remote user terminals representing a selection made by the remote user from the set of products in the service map.

36. The method of claim 35 further including providing an interface for remote communications that permits a service provider to select features for its service map from a list of available features provided by the host computer.

37. A method as in claim 31, wherein the remote user transmits a search inquiry to said host computer.

38. A system for hosting a remote on-line shopping system for a plurality of remote service providers, comprising:

a host processor that executes program instructions;

a host memory coupled to said host processor;

a host communications interface coupled to said host processor, said host communications interface capable of communicating with remote user terminals;

a plurality of service maps stored in said host memory, each of said service maps being customized to include data representing options available from and determined by the remote service providers that may be selected by a remote user, said options including a list of products for sale from the associated remote service provider; and software executed by said host processor that identifies options from the service maps selected by said remote user terminals.

39. The system of claim 38, wherein said host communications interface is further capable of communicating with the remote service providers.

40. The system of claim 39, wherein said software permits said host processor to transmit user data to a service provider.

41. The system of claim 40 wherein said user data includes billing information.

42. The system of claim 38, including system features and menu creation software for allowing a plurality of service providers to define unique service maps.

43. The system of claim 42, wherein said service maps comprise provider specific menu data for providing on-line shopping features to a remote user terminal based upon selections made by the remote user from the associated service map of a particular service provider.

44. The system of claim 38, including system features and menu creation software for allowing a plurality of service providers to edit existing service maps.

45. The system of claim 38 wherein said service map comprises a menu of said options.

46. The system of claim 38 wherein said options include an option to purchase a product.

47. The system of claim 38 wherein one of said options includes requesting another service map.

48. The method of claim 38 wherein said user terminals comprise interactive television devices.

49. A method of hosting an on-line shopping system in which products from a plurality of remote service providers may be purchased by a plurality of remote subscribers, comprising:

storing service maps for service providers in a host computer, each service map defining a customized set of products that are offered for sale by one of said service providers and that may be selected for purchase by the plurality of remote subscribers, wherein the products are specified by the remote service providers as part of the customization of the associated service map;

receiving a request from at least one of said remote subscribers for the service map of any of said remote service providers;

transmitting said requested service map from said host computer to said subscriber over a communications link;

in response to the selection of one of said products by said subscriber, receiving at said host computer a code from said subscriber identifying the selected product; and transmitting data associated with the selected product from said host computer to said subscriber.

50. A method of hosting an on-line shopping system in which products from a plurality of remote service providers may be purchased by a plurality of remote subscribers, comprising:

storing service maps for service providers in a host computer, each service map defining a customized set of products that are offered for sale by one of the service providers and that may be selected for purchase by the plurality of remote subscribers, wherein the products are specified by the remote service providers as part of the customization of the associated service map;

receiving a request from at least one of said remote subscribers for the service map of any of said remote service providers, said request transmitted over a TCP/IP compatible network;

transmitting said requested service map from said host computer to said subscriber over the TCP/IP compatible network;

in response to the selection of one of said products by said subscriber, receiving at said host computer a code from said subscriber over the TCP/IP compatible network identifying the selected product; and transmitting data associated with the selected product from said host computer to said subscriber over said TCP/IP compatible network.

* * * * *

UNITED STATES PATENT AND TRADEMARK OFFICE
CERTIFICATE OF CORRECTION

PATENT NO. : 6,119,152
DATED : September 12, 2000
INVENTOR(S) : Richard K. CARLIN and Joseph F. FRANTZ, II It is certified that error appears in the above-identified patent and that said Letters Patent is hereby corrected as shown below:

Column 10 delete Lines 45-47;

Column 10, Line 62 change "form" to --from--; and

Column 11, Line 7 change "front" to --from--.

Signed and Sealed this

First Day of May, 2001

Attest:

NICHOLAS P. GODICI

*Attesting Officer*  *Acting Director of the United States Patent and Trademark Office*